United States Patent [19]
Jimbou et al.

[11] 4,367,017
[45] Jan. 4, 1983

[54] LASER BEAM REFLECTION SYSTEM

[75] Inventors: Ryutarou Jimbou, Hitachiota; Tomio Umino; Tomohiko Shida, both of Hitachi; Tomio Iizuka, Tokaimura; Shoji Isobe, Hitachi, all of Japan

[73] Assignee: Hitachi, Ltd., Tokyo, Japan

[21] Appl. No.: 190,202

[22] Filed: Sep. 24, 1980

[30] Foreign Application Priority Data

Sep. 28, 1979 [JP] Japan ................................. 54-123808

[51] Int. Cl.$^3$ ..................... B23K 26/08; G02B 5/10
[52] U.S. Cl. ........................... 350/486; 219/121 LV; 350/299
[58] Field of Search .................. 350/486, 299; 219/121 L, 121 LU, 121 LV, 121 LW

[56] References Cited
U.S. PATENT DOCUMENTS 3,619,550 11/1971 Matthews .................... 219/121 LU
3,986,767 10/1976 Rexer et al. ....................... 350/299
4,160,894 7/1979 Stemmler et al. ............. 219/121 L Primary Examiner—R. A. Rosenberger
Attorney, Agent, or Firm—Antonelli, Terry & Wands

[57] ABSTRACT

A laser beam reflection system for applying a laser beam to an area to be treated. The laser beam reflection system has a hollow head housing, first reflecting mirror means disposed in the rotary head housing and adapted to deflect the laser beam introduced into the rotary head housing away from the axis, second reflecting mirror means disposed in the rotary head housing and adapted to reflect the laser beam coming from the first reflecting mirror means to such a direction as to traverse the axis, and third reflecting mirror means disposed in the head housing movably in the direction traversing the axis and adapted to reflect and focus onto the area the laser beam coming from the second reflecting mirror means. The laser beam reflection system of the invention can be used for welding, surface treatment, heat treatment, cutting of various materials, and a light source of laser communication systems.

11 Claims, 6 Drawing Figures

LASER BEAM REFLECTION SYSTEM

BACKGROUND OF THE INVENTION

The present invention relates to a laser beam head and, more particularly, to a rotary laser beam head suitable for use in welding of fine tubes at their peripheries to an end plate which, in combination with the tubes, constitutes a heat exchanger. The rotary laser beam head of the invention, however, can apply other purposes than the welding: namely, cutting, heat treatment, surface treatment of materials, and a light source for laser communication systems.

FIG. 1 annexed to this specification shows a conventional apparatus for a laser beam welding, which is shown in an article entitled "Welding With a High-Power $CO_2$ Laser" published in Society of Automotive Engineers in 1974. This apparatus is designed to conduct a welding along a circular welding line. In this apparatus, the laser beam 1 introduced into a rotary head 2 is reflected at a right angle by a reflecting mirror 3 having a parabolic surface and is concentrated or focussed in the direction of penetration depth to the welding portion by means of a stationary reflecting mirror 4. For effecting the welding along a circular welding line, the rotary laser beam head 2 is rotated at its bearing portion 5 in the direction of arrow 7.

This known apparatus has a drawback that, since the distance between the axis of rotation and the focussing point of the focussed laser beam 1 cannot be decreased below the diameter of the laser beam 1 coming into the rotary laser beam head 2, it is not possible to conduct the peripheral welding of a tube having a diameter smaller than the diameter of the laser beam.

SUMMARY OF THE INVENTION

It is, therefore, a major object of the invention to provide a rotary laser beam head capable of effecting the welding along a circular welding line of any desired diameter and capable of directing the laser beam in the direction of penetration depth of the welding object irrespective of the diameter of the welding line.

To this end, according to the invention, there is provided a rotary laser beam head in which the laser beam introduced into the rotary head is made to advance along an optic system which is rotated together with the head to weld the welding object, characterized by an intermediate reflecting mirror and means for permitting a beam focussing mirror which receives the beam from the reflecting mirror to be movable radially to the desired position from the axis of rotation of the head, thereby to make it possible to direct the laser beam to the circular weld zone of any desired diameter in the direction of penetration depth by the rotation of the head.

DESCRIPTION OF THE PREFERRED EMBODIMENTS

Hereinafter, preferred embodiments of the invention, applied to welding by way of example, will be described with reference to the accompanying drawings.

Figure 2:
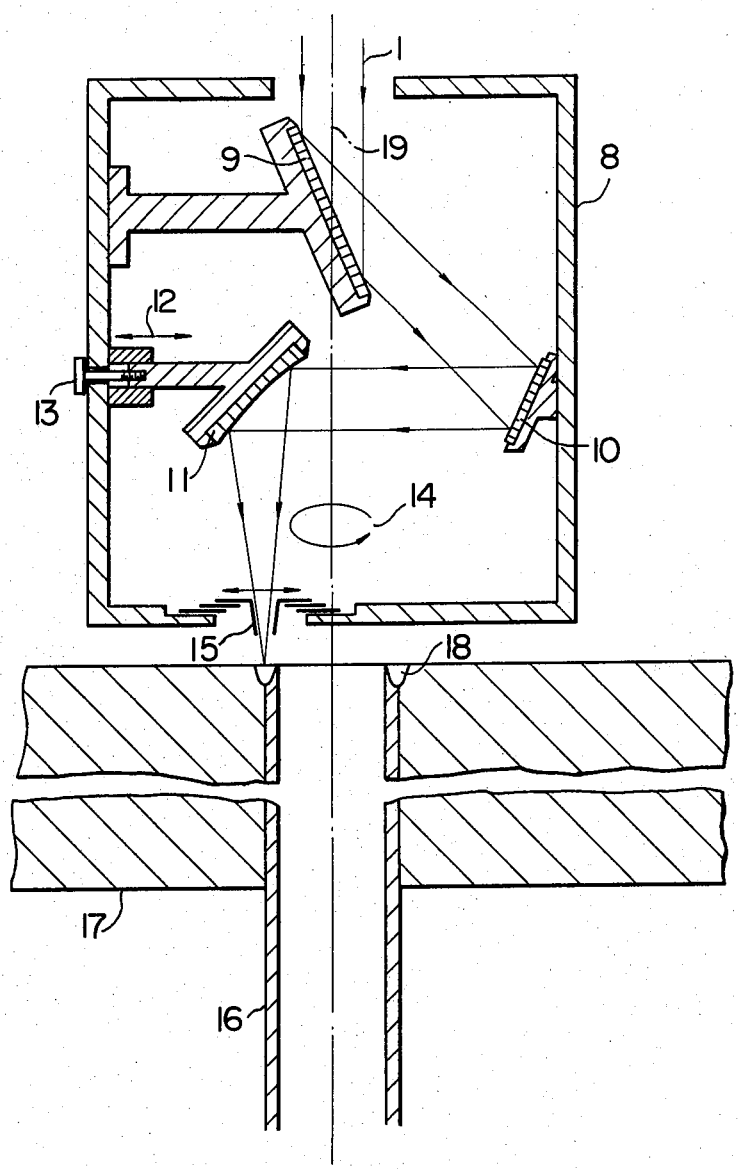

Referring to FIG. 2 showing in section a first embodiment of the invention, a welding head housing 8 having an outside diameter of 160 mm and a height of 180 mm is adapted to be rotated around an axis 19. A laser beam 1 of 20 mm dia. introduced into the welding head housing 8 along the axis 19 is deflected away from the axis 19 by means of a first reflecting mirror 9 and directed downwardly toward a second reflecting mirror 10 made of pure copper and having an diameter of 40 mm and a thickness of 10 mm. The laser beam 1 is reflected by this second reflecting mirror 10 to such a direction as to cross the axis 19 substantially at a right angle. The laser beam 1 then comes into a third reflecting mirror 11 having a parabolic surface and acting as a beam focusing mirror. The third reflecting mirror 11 also is made of pure copper and has an diameter of 50 mm and minimum thickness of 10 mm. The third reflecting mirror 11 is adapted to be movable in the radial direction as shown by arrow 12 by means of a knob 13. The angle of the third reflecting mirror 11 is previously adjusted such that the laser beam 1 focussed by the mirror 11 is applied to the circular welding zone 18 at a right angle to the latter.

The laser beam 1 focussed by the third reflecting mirror 11 passes the center of the movable beam nozzle 15 and is applied to the circular welding zone 18 which, in this case, includes a joint interface defined between the outer peripheral surface of a tube 16 of 50 mm outside dia. and 3.5 mm thick located beneath the rotary head housing 8 and the inner peripheral surface of a bore formed in a tube plate 17 of about 300 mm thick. The inside diameter of the bore is about 0.1 mm greater than the outside diameter of the tube 16. During the application of the laser beam 1 at an irradiation output of about 1.7 KW to the circular welding zone 18, the welding head 8 is rotated in a direction of arrow 14 by a driving means (not shown) at a speed of 25 mm/sec, with the axis 19 of rotation of the head 8 coinciding with the axis 19 of the tube 16.

In the described embodiment, the diameter of the circular welding zone 18 can be varied between zero and the maximum size which is limited by the construction of the welding head housing 8, simply by radially moving the third reflecting mirror 11 with respect to the axis 19 of rotation of the welding head housing 8, i.e. with respect to the axis of the circular welding zone.

Figure 1:
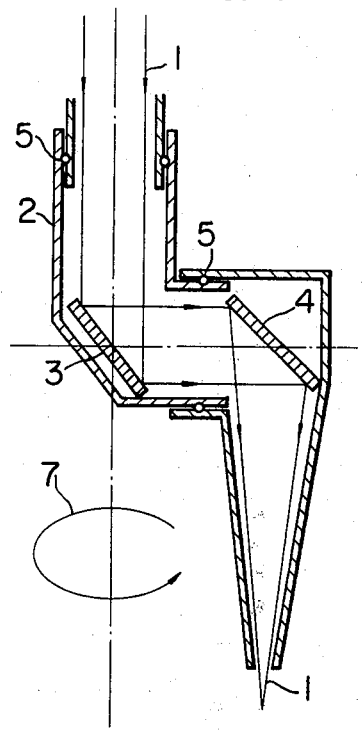
FIG. 1 is a sectional view of a conventional rotary laser beam head.
Figure 3:
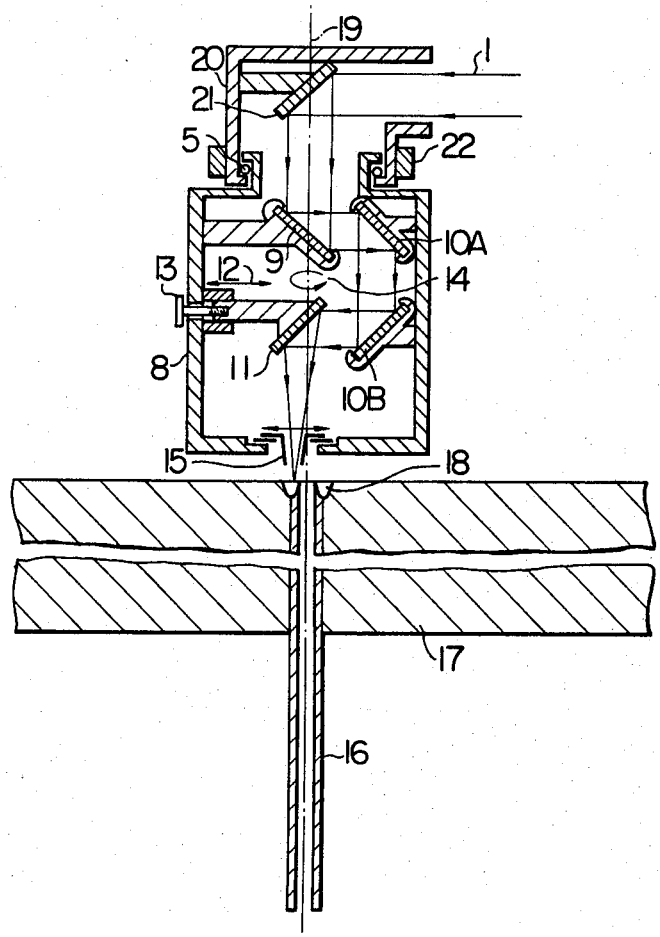
FIGS. 2, 3 and 4 are sectional views of different embodiments of the invention.

FIG. 3 shows another embodiment of the invention. This rotary laser beam head differs from that shown in FIG. 2 in that two second reflecting mirrors are used and that the laser beam 1 passes substantially in parallel with and perpendicularly to the axis 19 of the welding head housing 8 having an outside diameter of 120 mm and a height of 190 mm. In operation, the laser beam 1 is deflected, by means of a reflecting mirror (flat mirror) 21 disposed at the beam inlet opening 20 fixed through a member 22 to a frame (not shown) and having a diameter of about 40 mm and a thickness of about 10 mm, to advance in the direction parallel to the axis 19 of rotation of the welding head housing 8. The laser beam 1 is then reflected by a first reflecting mirror 9 of about 40 mm dia. and 10 mm thick and then by the second reflecting mirrors 10A and 10B successively. These second reflecting mirrors 10A, 10B have equal size to the first reflecting mirror 9. The laser beam reflected substantially at a right angle at each second reflecting mirror is then reflected and focussed by a third reflecting mirror 11 having a parabolic surface and is applied to the circular welding zone 18. The construction and welding condition of the third reflecting mirror 11 are identical to those of the case shown in FIG. 2. The outside diameter and thickness of the tube 16 are 15.5 mm and 3.5 mm.

This embodiment offers the following advantage, in addition to the advantage offered by the first embodiment shown in FIG. 2. Namely, the alignment of the first reflecting mirror 9, second reflecting mirrors 10A, 10B and the third reflecting mirror 11 is easy to achieve. In addition, the diameter of the first reflecting mirror 9 and the minimum required length of the welding head housing 8 (distance between the upper end of the first reflecting mirror 9 and the lower end of the third reflecting mirror 11) can be reduced comparatively. The distance between the centers of the first reflecting mirror 9 and the reflecting mirror 21, and the distance between the centers of the second reflecting mirrors 10A, 10B are 47 mm and 35 mm, respectively.

Figure 4:
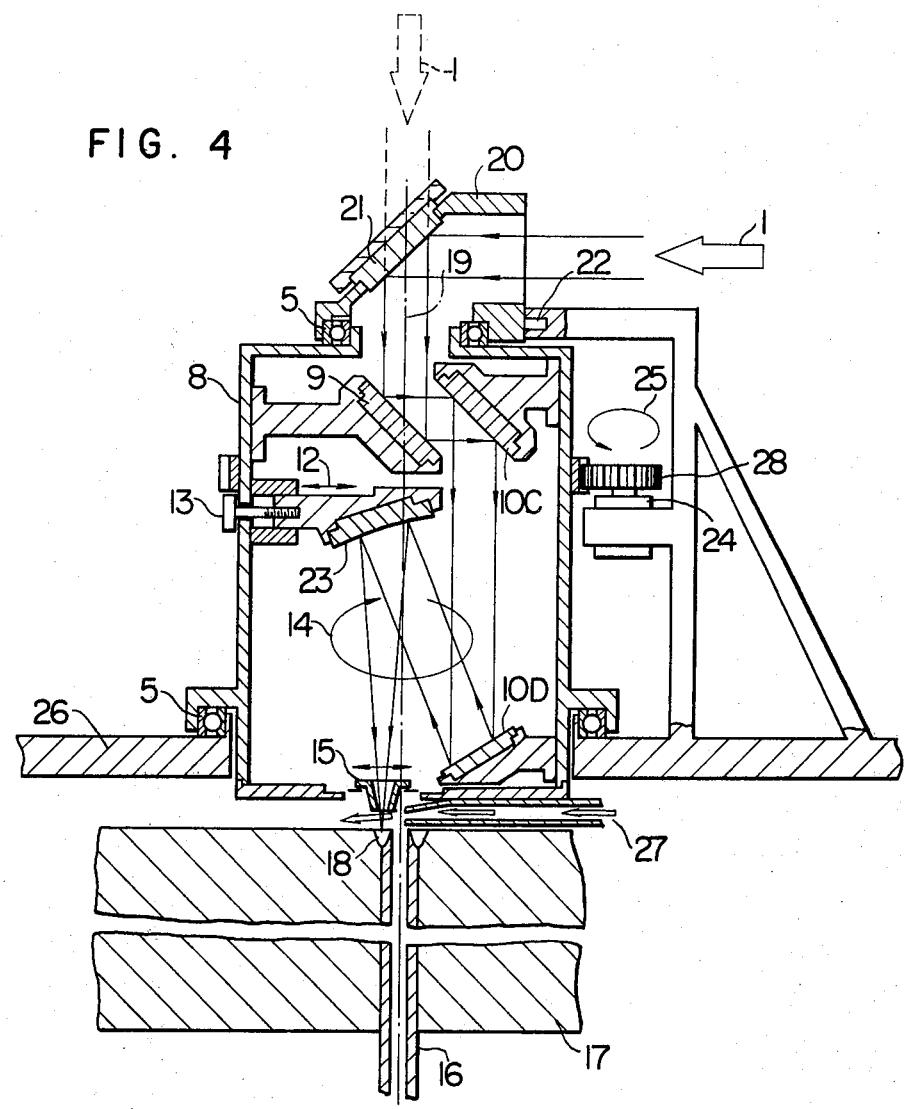

FIG. 4 shows a third embodiment of the invention which differs from the preceding embodiments shown in FIGS. 2 and 3 in that a third reflecting mirror 23 is a spherical mirror having a radius of curvature of 300 mm, as well as a diameter and minimum thickness of 50 mm and 12 mm, and that a second reflecting mirror 10D of 45 mm dia. and 12 mm thick is disposed beneath the third reflecting mirror 23 so that the incident laser beam and the reflected laser beam forms an acute angle on the second reflecting mirror 10D.

Referring to FIG. 4, a welding head housing 8 having an outside diameter of 170 mm and a height of 300 mm is rotatably supported on a frame 26 by means of the bearing portion 5. A frame carrying a motor 24 is fixed to the beam inlet opening 20. The first reflecting mirrors 9, 21 and the second reflecting mirror 10D have a common diameter and a common thickness of 50 mm and 12 mm. As a gear 28 is rotated in the direction indicated by an arrow 25 following up the rotation of the shaft of motor 24, the welding head housing 8 is rotated around the axis of the tube 16 in the direction indicated by arrow 14, so that the laser beam 1 focussed by the third reflecting mirror 23 is moved along the circular welding object 18. During the welding by the application of laser beam, argon gas is jetted from a nozzle 27 at a rate of 10 liters per minute to remove the plasma and to prevent the oxidation of the welded surface. The welding condition is same as that of the case shown in FIG. 2. The distance between the first reflecting mirror 9 and the second reflecting mirror 10C as measured at their centers is 36 mm, while the distance between the centers of the second reflecting mirrors 10C and 10D is 165 mm.

This embodiment offers an advantage that the third reflecting mirror 23, which is a spherical mirror, is easy to fabricate.

Although the mechanisms for driving the welding head housing and for the gas shielding are omitted from FIGS. 2 and 3, it will be clear to those skilled in the art that the rotation of the welding head housing 8 and the gas shielding are made in the same manner as those in the embodiment shown in FIG. 4, also in the embodiments shown in FIGS. 2 and 3.

In the embodiments shown in FIGS. 2 and 4, the laser beam reflected by the second reflecting mirror crosses the axis 19 of rotation of the welding head housing 8, before it enters the third reflecting mirror. This arrangement, however, is not essential and the third reflecting mirror may be mounted at the same side of the axis 19 as the second reflecting mirror. In such a case, since there is a possibility that the third reflecting mirror is slightly moved during rotation of the welding head housing 8, it is preferred to secure the third reflecting mirror movably and to provide means for fixing the third reflecting mirror after adjustment of the latter.

Figure 5:
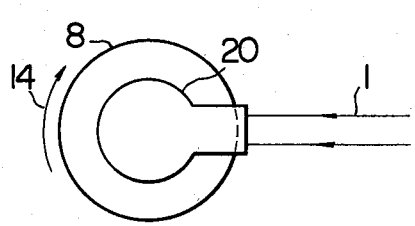
FIGS. 5 and 6 are schematic plan views of welding heads in accordance with the invention.
Figure 6:
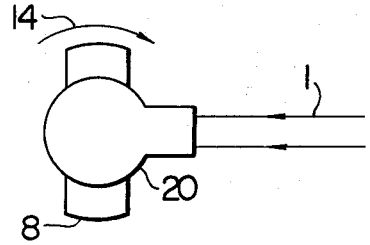

The welding head housing 8 can have a cylindrical form as shown in FIG. 5 or can have a form of an angled tubular body the cross-section of which is of a configuration prepared by bulging both short sides of a rectangle into arcuate ones as shown in FIG. 6. The cylindrical welding head housing 8 can rotate in a stable manner, while the angled tubular shape of the same permits the size of the welding head housing 8 to be reduced.

According to the invention, it is possible to effect a laser beam welding of juncture between the bore in a tubular plate and a tube having any desired diameter. In addition, since the laser beam can be applied in the direction of depth of penetration regarding the welding zone, it is possible to reduce the welding distortion and stress-corrosion cracking.

Although the invention has been described through welding apparatus by way of example, the invention finds various other uses such as heat treatment and surface treatment of materials. It is also possible to cut materials with the apparatus of the invention, by jetting a gas from a nozzle 15 at a comparatively high pressure, while applying the laser beam.

What is claimed is:

1. A laser beam reflection system for applying a laser beam to an area to be treated, comprising
   a hollow head housing having an axis of rotation;
   first reflecting mirror means disposed in said head housing and adapted to reflect said laser beam introduced into said head housing so that said reflected laser beam forms an acute angle with respect to the axis of rotation of said head housing;
   second reflecting mirror means disposed in said head housing and adapted to change the direction of said laser beam reflected by said first reflecting mirror means to such a direction as to traverse said axis; and
   third reflecting mirror means disposed in said head housing and movable in the direction traversing said axis, said third reflecting mirror means being adapted to reflect said laser beam which is reflected from said second reflecting mirror means on said area to be treated.

2. A rotary laser beam head as claimed in claim 1, wherein said third reflecting mirror means is mounted such that the irradiation angle of said laser beam is adjustable with respect to said area to be treated.

3. A rotary laser beam head for applying a laser beam to an area to be treated, comprising:
   a hollow rotatable head housing mounted for rotation around an axis;
   first reflecting mirror means disposed in said head housing and adapted to reflect said laser beam introduced into said head housing so that said reflected laser beam forms an acute angle with respect to the axis of rotation;

second reflecting mirror means disposed in said head housing and adapted to change the direction of said laser beam reflected by said first reflecting mirror means to such a direction as to traverse said axis; and third reflecting mirror means disposed in said head housing and movable in the direction traversing said axis, said third reflecting mirror means being adapted to reflect and focus said laser beam which is reflected from said second reflecting mirror means on said area to be treated.

4. A rotary laser beam head as claimed in claim 1 or 3, wherein said laser beam is introduced into said head housing in parallel with said axis.

5. A rotary laser beam head for applying a laser beam to an area to be treated, comprising:

a hollow rotatable head housing mounted for rotation around an axis;

first reflecting mirror means disposed in said head housing and adapted to reflect said laser beam introduced into said head housing from said axis of rotation;

second reflecting mirror means disposed in said head housing and adapted to change the direction of said laser beam reflected by said first reflecting mirror means to such a direction as to traverse said axis; and third reflecting mirror means disposed in said head housing and movable in the direction traversing said axis; said third reflecting mirror means being adapted to reflect and focus said laser beam which is reflected from said second reflecting mirror means on said area to be treated, said second reflecting mirror means including a reflecting mirror adapted to reflect substantially at a right angle the laser beam reflected by said first reflecting mirror means and another reflecting mirror adapted to reflect at an acute angle the laser beam reflected by said reflecting mirror, and said third reflecting mirror means being a spherical mirror.

6. A rotary laser beam head as claimed in claim 1, 3 or 5, wherein said laser beam is introduced into said head housing at a right angle to said axis.

7. A rotary laser beam head as claimed in claim 1, 3 or 5, wherein said first reflecting mirror means include a reflecting mirror adapted to reflect substantially at a right angle the laser beam introduced into said head housing, and another reflecting mirror adapted to reflect substantially at a right angle the laser beam coming from the first-mentioned reflecting mirror.

8. A rotary laser beam head as claimed in any one of claims 1, 3 or 5, wherein said rotary head housing has a cylindrical form.

9. A rotary laser beam head for applying a laser beam to an area to be treated, comprising:

a hollow rotatable head housing mounted for rotation around an axis;

first reflecting mirror means disposed in said head housing and adapted to reflect said laser beam introduced into said head housing from said axis of rotation;

second reflecting mirror means disposed in said head housing and adapted to change the direction of said laser beam reflected by said first reflecting mirror means to such a direction as to traverse said axis; and third reflecting mirror means disposed in said head housing and movable in the direction traversing said axis, said third reflecting mirror means being adapted to reflect and focus said laser beam which is reflected from said second reflecting mirror means on said area to be treated, said first and second reflecting mirror means being spaced from each other in both of directions parallel to and perpendicular to said axis, while said second and third reflecting mirror means are positioned at the same level with respect to said axis but are spaced from each other in the direction perpendicular to the same.

10. A rotary laser beam head as claimed in claim 9, wherein said first reflecting mirror means reflects said laser beam introduced into said head housing so that said reflected laser beam forms an acute angle with respect to the axis of rotation of said head housing.

11. A rotary laser beam head as claimed in claim 1, 3, 5 or 9, wherein said third reflecting mirror means is disposed for directly focusing and reflecting the laser beam on said area to be treated.

* * * * *